(12) United States Patent
Berg et al.

(10) Patent No.: US 7,984,418 B2
(45) Date of Patent: Jul. 19, 2011

(54) METHOD AND APPARATUS FOR SITUATIONALLY AWARE DELIVERY OF OBJECT INSTANCES TO A CLIENT

(75) Inventors: Daniel Christopher Berg, Cary, NC (US); Michael Damein Elder, Durham, NC (US); Ritchard Leonard Schacher, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1851 days.

(21) Appl. No.: 11/089,760

(22) Filed: Mar. 24, 2005

(65) Prior Publication Data

US 2006/0218546 A1    Sep. 28, 2006

(51) Int. Cl.
 G06F 9/44 (2006.01)
 G06F 15/16 (2006.01)

(52) U.S. Cl. ........ 717/108; 717/106; 717/116; 709/203; 719/316

(58) Field of Classification Search .................. 717/108, 717/116
See application file for complete search history.

(56) References Cited

U.S. PATENT DOCUMENTS

| | | | | |
|---|---|---|---|---|
| 5,341,477 A * | 8/1994 | Pitkin et al. | | 709/226 |
| 5,499,371 A * | 3/1996 | Henninger et al. | | 717/108 |
| 5,761,512 A * | 6/1998 | Breslau et al. | | 717/140 |
| 5,774,728 A * | 6/1998 | Breslau et al. | | 717/141 |
| 5,991,802 A * | 11/1999 | Allard et al. | | 709/219 |
| 6,301,601 B1 * | 10/2001 | Helland et al. | | 718/101 |
| 6,370,561 B1 * | 4/2002 | Allard et al. | | 709/203 |
| 6,389,491 B1 * | 5/2002 | Jacobson et al. | | 710/62 |
| 6,430,607 B1 * | 8/2002 | Kavner | | 709/217 |
| 6,442,620 B1 | 8/2002 | Thatte et al. | | 709/316 |
| 6,487,714 B1 | 11/2002 | Azagury et al. | | 717/116 |
| 6,529,936 B1 * | 3/2003 | Mayo et al. | | 709/202 |
| 6,714,962 B1 * | 3/2004 | Helland et al. | | 709/203 |
| 6,961,750 B1 * | 11/2005 | Burd et al. | | 709/203 |
| 7,010,778 B2 * | 3/2006 | Cook | | 717/106 |
| 7,013,340 B1 * | 3/2006 | Burd et al. | | 709/229 |
| 7,076,786 B2 * | 7/2006 | Burd et al. | | 719/316 |
| 7,120,897 B2 * | 10/2006 | Ebbo et al. | | 717/108 |
| 7,228,525 B2 * | 6/2007 | Chadzelek | | 717/106 |
| 7,321,918 B2 * | 1/2008 | Burd et al. | | 709/203 |
| 7,415,524 B2 * | 8/2008 | Burd et al. | | 709/229 |
| 2003/0009519 A1 * | 1/2003 | Gosling et al. | | 709/203 |

(Continued)

OTHER PUBLICATIONS

Michael Flanakin, "Implementing HTTP Handlers in ASP.NET", Dec. 26, 2004, retrieved from <http://www.developerfusion.com/article/4643/implementing-http-handlers-in-aspnet/> total pp. 3.*

(Continued)

Primary Examiner — Tuan Q Dam
Assistant Examiner — Marina Lee
(74) Attorney, Agent, or Firm — Steven M. Greenberg, Esq.; Carey, Rodriguez, Greenberg & Paul (57) ABSTRACT

A situation object instantiator (SOI) receives a request from a client including a typekey. Available situations are retrieved. For a retrieved situation, a call to an evaluator is made. If the situation is active a check is made to see if an instantiator exists for the typekey and situation. If so, the object instantiator is called, it returns an instance to the SOI, and the SOI returns the instance to the client. If not, more situations are retrieved until the situations are exhausted, and such is communicated to the client.

18 Claims, 6 Drawing Sheets

U.S. PATENT DOCUMENTS

| | | | |
|---|---|---|---|
| 2003/0187916 A1* | 10/2003 | Dettinger et al. | 709/203 |
| 2004/0205696 A1* | 10/2004 | Chupa et al. | 717/106 |
| 2004/0230665 A1* | 11/2004 | Xiao et al. | 709/217 |
| 2006/0218546 A1* | 9/2006 | Berg et al. | 717/171 |

OTHER PUBLICATIONS

Schmidt et al., "The Adaptive Service Executive: An Object-Oriented Architecture for Configuring Concurrent Distributed Communication Systems", 1994, retrieved from <citeseerx.ist.psu.edu>, total pp. 11.*

McComb et al., "Animation of Object-Z Specifications Using a Z Animator", School of Information Technology and Electrical Engineering, Queensland University, Australia, 2003, Abstract.

Oda et al, "The Flying Object for an Open Distributed Environment", Department of Artificial Intelligence, Kyushu Institute of Technology, Japan, 2001, Abstract.

Milojicic et al., "Process Migration", University of Toronto and Platform Computing, ACM Computing Surveys, vol. 32, No. 3, Sep. 2000, pp. 241-299.

* cited by examiner

METHOD AND APPARATUS FOR SITUATIONALLY AWARE DELIVERY OF OBJECT INSTANCES TO A CLIENT

BACKGROUND OF THE INVENTION

1. Technical Field

The present invention relates to code maintainability within an object oriented environment, and more specifically, the present invention relates to creating instances of code, which may be executable, based on an apparent database of situations that may be applicable to the function of a program code of a client.

2. Description of Related Art

Dynamic software systems, such as those commonly used in object oriented programming, may need to deal with fairly ad hoc arrangements of hardware and operating systems, among other things. Thus, a well-defined class of objects may accomplish essentially the same function in instances specific to each of several situations. A specialization is an implementation of a software component designed for a specific, focused case or situation. For example, for a class (the general) that accomplishes a rendition of text in a string, there may be a situation where the only display available is a graphical user interface with an active window allocated to producing text. Another situation may be a simple line-based terminal. Still another situation could be a speaker connected to a voice synthesis device.

Under such circumstances, to make the class able to handle rendering the string under all situations, the existing methods would, for example, provide a number of alternative tracts of code within interpreted or machine executable software. This existing method created the problem that the complexity of program code became rather cluttered, and often lead to duplicating code throughout the software system. Often, this would increase the costs of maintaining such code, e.g. as would become necessary when a new form factor for display emerged among manufactured devices.

Thus it became evident that there is a need for a software system to identify a software component in a flexible manner, without unnecessary redundancy of code.

BRIEF SUMMARY OF THE INVENTION

The present invention provides a method, apparatus, and computer program product for creating an instantiation that is responsive to the specific situation that a code is executing in is disclosed. First a request is received form the client with some uniquely defined key that corresponds to one program function. The key may have one or more situations for which code exists, or for which a class may be is sufficiently well defined to create code or an instance, and each situation may be looked up, up to a point. A determination is made that a situation is active or inactive with respect to the client's running code. In case the given situation is active, it is further determined if an object instantiator exists that can provide an instance for the situation and key (or typekey). If so, an object is requested from the object instantiator, and finally delivered to the client for execution.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

An embodiment of the invention may, within the confines of a software system, identify a software component in a flexible manner, without unnecessary redundancy of code.

Figure 1:
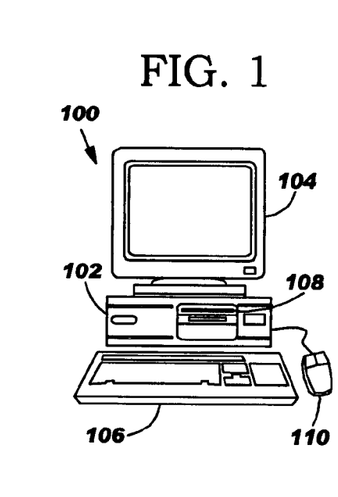
FIG. 1 is a generic computer system in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
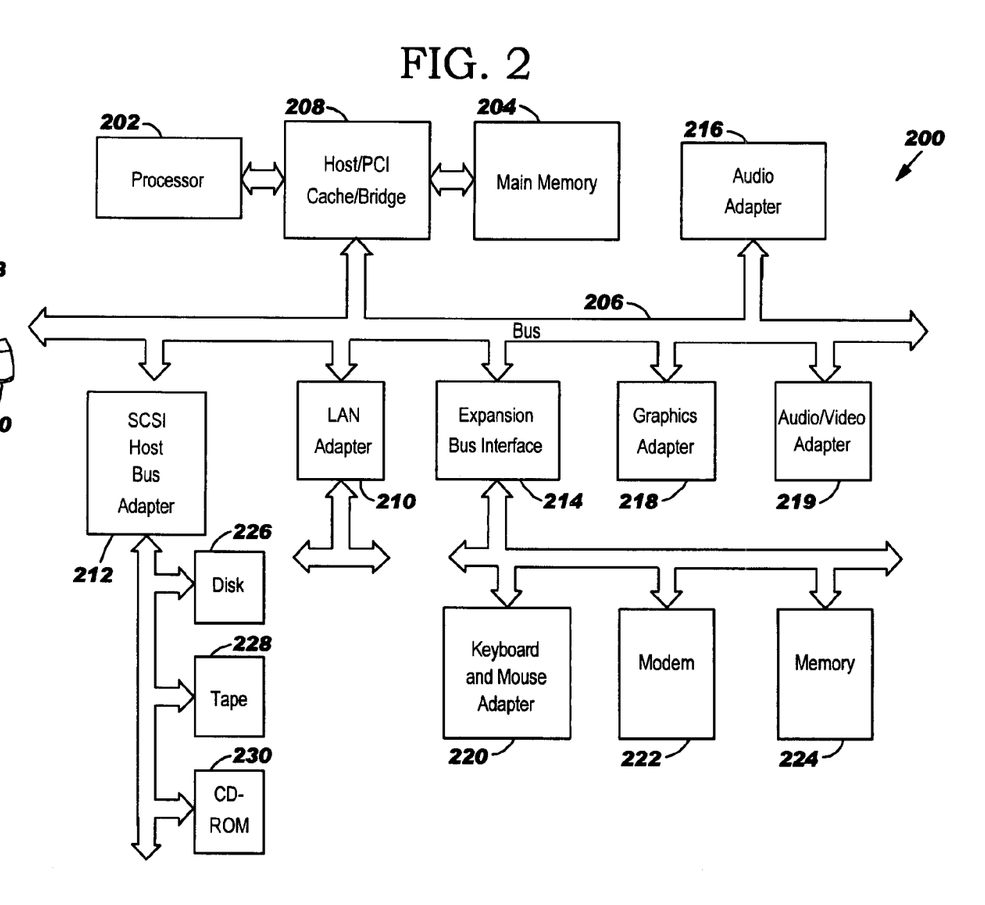
FIG. 2 is data processing system in accordance with a preferred embodiment of the present invention.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as WINDOWS XP, which is available from Microsoft Corporation. An object oriented programming system such as JAVA may run in conjunction with the operating system and provides calls to the operating system from JAVA programs or applications executing on data processing system 200. "JAVA" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in F*igure* 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance. The processes of the present invention are performed by processor 202 using computer implemented instructions, which may be located in a memory such as, for example, main memory 204, memory 224, or in one or more peripheral devices 226-230.

Figure 3:
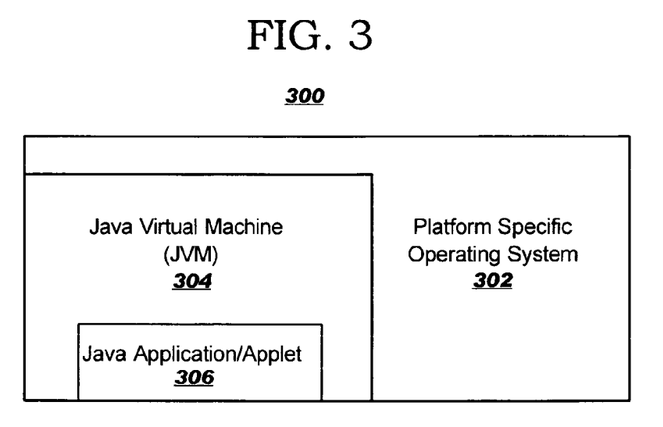
FIG. 3 is a block diagram showing the relationship of software components operating within a computer system in accordance with a preferred embodiment of the present invention.

With reference now to FIG. 3, a block diagram illustrates the relationship of software components operating within a computer system that may implement the present invention. JAVA-based system 300 contains platform specific operating system 302 that provides hardware and system support to software executing on a specific hardware platform. JVM 304 is one software application that may execute in conjunction with the operating system. JVM 304 provides a JAVA runtime environment with the ability to execute JAVA application or applet 306, which is a program, servlet, or software component written in the JAVA programming language. The computer system in which JVM 304 operates may be similar to data processing system 200 or computer 100 described above. However, JVM 304 may be implemented in dedicated hardware on a so-called JAVA chip, JAVA-on-silicon, or JAVA processor with an embedded pico JAVA core.

At the center of a JAVA run-time environment is the JVM, which supports all aspects of JAVA's environment, including its architecture, security features, mobility across networks and platform independence.

The JVM is a virtual computer, i.e. a computer that is specified abstractly. The specification defines certain features that every JVM must implement, with some range of design choices that may depend upon the platform on which the JVM is designed to execute. For example, all JVMs must execute JAVA bytecodes and may use a range of techniques to execute the instructions represented by the bytecodes. A JVM may be implemented completely in software or somewhat in hardware. This flexibility allows different JVMs to be designed for mainframe computers and PDAs.

The JVM is the name of a virtual computer component that actually executes JAVA programs. JAVA programs are not run directly by the central processor but instead by the JVM, which is itself a piece of software running on the processor. The JVM allows JAVA programs to be executed on a different platform as opposed to only the one platform for which the code was compiled. JAVA programs are compiled for the JVM. In this manner, JAVA is able to support applications for many types of data processing systems, which may contain a variety of central processing units and operating systems architectures. To enable a JAVA application to execute on different types of data processing systems, a compiler typically generates an architecture-neutral file format—the compiled code is executable on many processors, given the presence of the JAVA run-time system. The JAVA compiler generates bytecode instructions that are nonspecific to a particular computer architecture. A bytecode is a machine independent code generated by the JAVA compiler and executed by a JAVA interpreter. A JAVA interpreter is part of the JVM that alternately decodes and interprets a bytecode or bytecodes. These bytecode instructions are designed to be easy to interpret on any computer and easily translated on the fly into native machine code. Bytecodes may be translated into native code by a just-in-time compiler or JIT.

A JVM loads class files and executes the bytecodes within them. The class files are loaded by a class loader in the JVM. The class loader loads class files from an application and the class files from the JAVA application programming interfaces (APIs) which are needed by the application. The execution engine that executes the bytecodes may vary across platforms and implementations.

One type of software-based execution engine is a just-in-time compiler. With this type of execution, the bytecodes of a method are compiled to native machine code upon successful fulfillment of some type of criteria for jitting a method. The native machine code for the method is then cached and reused upon the next invocation of the method. The execution engine may also be implemented in hardware and embedded on a chip so that the JAVA bytecodes are executed natively. JVMs usually interpret bytecodes, but JVMs may also use other techniques, such as just-in-time compiling, to execute bytecodes.

When an application is executed on a JVM that is implemented in software on a platform-specific operating system, a JAVA application may interact with the host operating system by invoking native methods. A JAVA method is written in the JAVA language, compiled to bytecodes, and stored in class files. A native method is written in some other language and compiled to the native machine code of a particular processor. Native methods are stored in a dynamically linked library whose exact form is platform specific.

Figure 4:
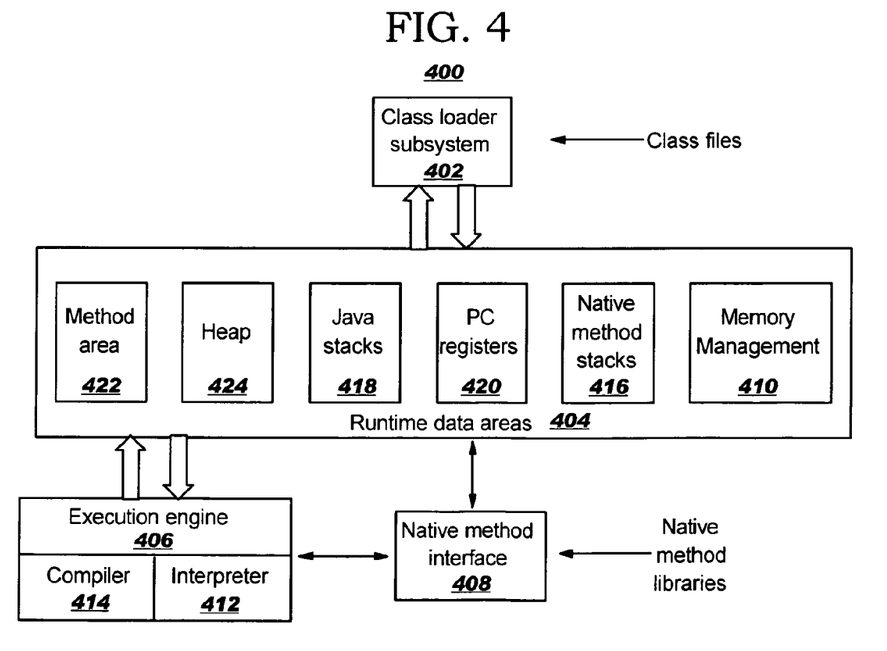
FIG. 4 is a block diagram of a Java Virtual Machine (JVM) in accordance with a preferred embodiment of the present invention.

With reference now to FIG. 4, a block diagram of a JVM is depicted in accordance with a preferred embodiment of the present invention. JVM 400 includes class loader subsystem 402, which is a mechanism for loading types, such as classes and interfaces, given fully qualified names. JVM 400 also contains runtime data areas 404, execution engine 406, native method interface 408, and memory management 410. Execution engine 406 is a mechanism for executing instructions contained in the methods of classes loaded by class loader subsystem 402. Execution engine 406 may be, for example, JAVA interpreter 412 or just-in-time compiler 414. Native method interface 408 allows access to resources in the underlying operating system. Native method interface 408 may be, for example, the JAVA Native Interface (JNI).

Runtime data areas 404 contain native method stacks 416, JAVA stacks 418, Program Counter (PC) registers 420, method area 422, and heap 424. These different data areas represent the organization of memory needed by JVM 400 to execute a program.

JAVA stacks 418 are used to store the state of JAVA method invocations. When a new thread is launched, the JVM creates a new JAVA stack for the thread. The JVM performs only two operations directly on JAVA stacks: it pushes and pops frames. A thread's JAVA stack stores the state of JAVA method invocations for the thread. The state of a JAVA method invocation includes its local variables, the parameters with which it was invoked, its return value, if any, and intermediate calculations. JAVA stacks are composed of stack frames. A stack frame contains the state of a single JAVA method invocation. When a thread invokes a method, the JVM pushes a new frame onto the JAVA stack of the thread. When the method completes, the JVM pops the frame for that method and discards it. The JVM does not have any registers for holding intermediate values; any JAVA instruction that requires or produces an intermediate value uses the stack for holding the intermediate values. In this manner, the JAVA instruction set is well-defined for a variety of platform architectures.

Program counter (PC) registers 420 are used to indicate the next instruction to be executed. Each instantiated thread gets its own PC register and JAVA stack. If the thread is executing a JVM method, the value of the PC register indicates the next instruction to execute. If the thread is executing a native method, then the contents of the PC register are undefined.

Native method stacks 416 stores the state of invocations of native methods. The state of native method invocations is stored in an implementation-dependent way in native method stacks, registers, or other implementation-dependent memory areas. In some JVM implementations, native method stacks 416 and JAVA stacks 418 are combined.

Method area 422 contains class data while heap 424 contains all instantiated objects. The constant pool is located in method area 422 in these examples. The JVM specification strictly defines data types and operations. Most JVMs choose to have one method area and one heap, each of which is shared by all threads running inside the JVM, such as JVM 400. When JVM 400 loads a class file, it parses information about a type from the binary data contained in the class file. JVM 400 places this type of information into the method area. Each time a class instance or array is created, the memory for the new object is allocated from heap 424. JVM 400 includes an instruction that allocates memory space within the memory for heap 424 but includes no instruction for freeing that space within the memory. Memory management 410 in the depicted example manages memory space within the memory allocated to heap 424. Memory management 410 may include a garbage collector, which automatically reclaims memory used by objects that are no longer referenced. Additionally, a garbage collector also may move objects to reduce heap fragmentation.

The following definitions will be used in the description of the steps used by an embodiment of the present invention.

Active means the external or internal factors and conditions which define the Situation are evaluated to be present or true. For example, two execution paths may exist for an application which runs headless or in a graphical mode. Depending on the code path executed (or the entry point of the program code), the Evaluator could determine if the code path relevant to it was followed. Another way to detect that a situation is active is to look for specific classes to be available in the environment. Another way, in the context of checking for a Console or GUI, an embodiment of the invention may check to see if a graphical window is open or not. If no window is open, then it must be the "console" or headless situation is active.

A Class is a combination of methods and data that are encapsulated in a file that defines how data are stored and accessed. A class may form a template by which instances of running code may be created or instantiated.

A client is an executing program that relies on other entities or software to access or process data for the client. In some cases, the data to be processed may be a fully qualified class name, and the result returned may be an instance—itself software.

A code object is code that may be interpreted, JVM compiled, (i.e. bytecodes), or machine language. It may be an example of a class once instantiated for a specific purpose.

A key may be a fully qualified class name and sometimes is called a typekey. Alternatively, a key may be a client defined value.

Object Instantiator or ObjectInstantiator is a program or class that creates and instance of an object. The object created by the Object Instantiator conforms to the concept of an object as defined by Object Oriented Programming (OOP), but in general will be an encapsulated representation of actions and data which may or may not inherit from or allow its action and data to be inherited by other objects. The concept of ObjectInstantiator includes object creator or ObjectCreator.

A server is an executing program that acts as a resource to a client. The server may execute on a common computer with the client, or operate on a different computer. The server executes code to provide an output direct to the client, or produce an output or action of the computer or other resources of the server.

A situation is any set of factors external or internal to program code that affects how the program code executes at a given moment and includes:
  a) user-defined property values;
  b) operating system environment variables (which could specify time-zone or language); or
  c) execution mode e.g. console interface, GUI, etc.; or
  d) operating system.

So long as there are varying levels of priorities for each situation multiple situations may be active simultaneously. However, in the context where there are no variations in priority, each situation, however defined, cannot be active simultaneously with other situations defined by the known situations stored within the SituationalObjectInstantiator. For example, a console interface cannot be active simultaneously as the GUI interface for the client in cases where console interface and GUI interface have an identical priority.

As a point of nomenclature, for readability purposes, objects may be capitalized with a first letter or intermediate letter to improve readability. Thus, for example, SitutationalObjectInstantiator is the same as situtationalobjectinstantiator.

A preferred embodiment shows a computer program product for creating an instantiation that is responsive to the specific situation that a code is executing. Only the active situation or the situation having the highest priority is used to select an objectinstantiator.

Figure 5:
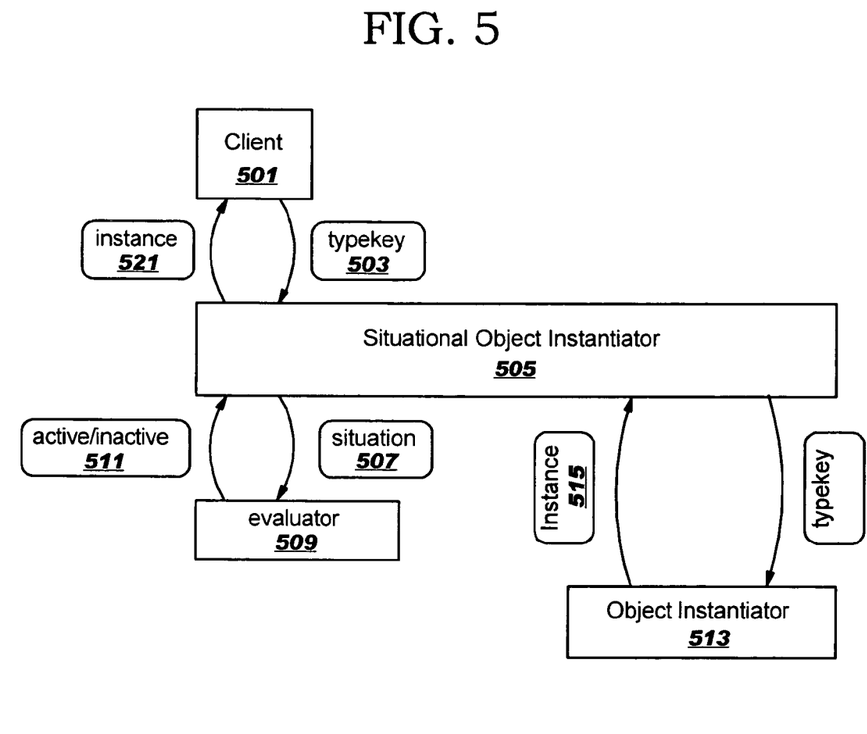
FIG. 5 is a data flow diagram showing data passed between code objects in accordance with a preferred embodiment of the present invention.

FIG. 5 shows various calls and data flow between objects used to instantiate objects in accordance with a preferred embodiment of the present invention. A client 501 makes a call to SituationalObjectInstantiator 505 by passing a typekey, or a unique identifier for a software component of the client. The SituationalObjectInstantiator 505 then, for each situation, passes that situation 507 to the evaluator 509 so that the evaluator may make a determination that the situation 507 is either active, or inactive 511. This is repeated for all situations, or at least until a situation 507 is found that is active. An ObjectInstantiator 513 may exist for the situation. If so, the typekey 503 (which is a more specific form of key) is relayed from SituationalObjectInstantiator to the ObjectInstantiator 513. ObjectInstantiator 513 creates a code object or instance 515 of the software component identified with the typekey and relays the code object or instance to the SituationalObjectInstantiator. The code object may be stored within the heap 424 of FIG. 4, and pointers to the code object may be passed instead of the object itself, for example. SituationalObjectInstantiator 505 further relays the instance 521 to the client. Though the instance is shown being passed from ObjectInstatiator to SituationalObject Instatiator, and then to Client 501, the instance is the same instance in each case.

Figure 6:
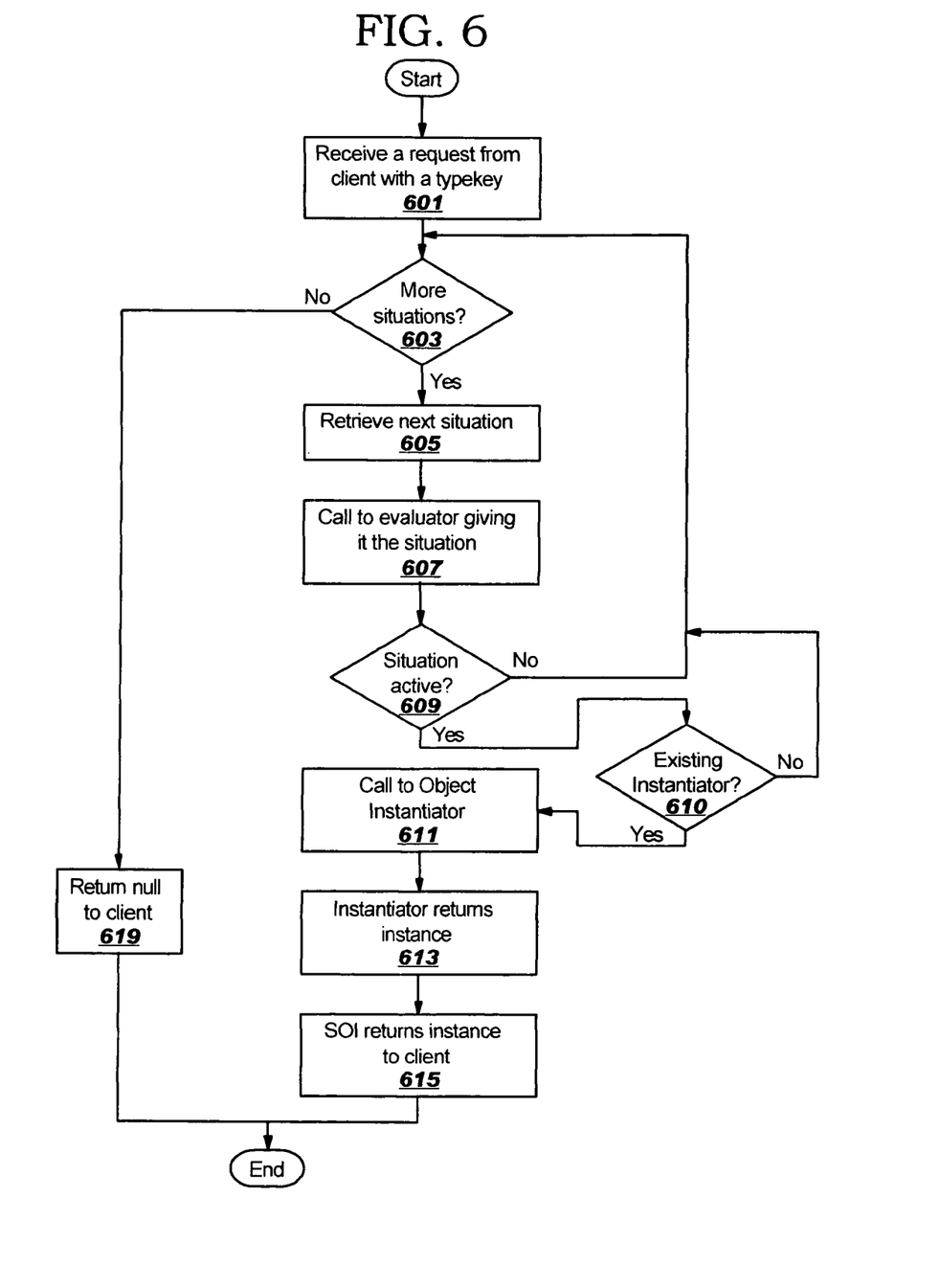
FIG. 6 is a flow chart showing the steps performed by a SituationalObjectInstantiator (SOI) in accordance with a preferred embodiment of the present invention.

FIG. 6 shows another way to look at the sequence of steps from the point of view of the SituationalObjectInstantiator or SitutationalObjectInstantiator (SOI). SOI receives a request from the client including a typekey (step 601). The SOI generates each situation it can (step 603). The step of generating may be either looking up situations in a database, or alternatively, creating details of a situation dynamically, under program control from constraints already established. Providing there are more situations, SOI generates or looks up the next situation (step 605). SOI calls to an evaluator, providing as a parameter, the current situation (step 607). The evaluator indicates if the situation is active or inactive (step 609). An active result stops continued looking for new situations and, instead, makes SOI call the ObjectInstantiator (step 611). ObjectInstantiator returns an instance (step 613) to SOI. SOI further returns the instance to the client (step 615).

However, if the situations are exhausted before an active situation (step 609) is found or otherwise created, processing continues to cause SOI to return a null to the client (step 619).

An example of a typekey, sometimes called a fully qualified class name may be "Display", which may be a software component that outputs a string using a device controlled by the client. The SOI may have a database of two situations: "Console", a monochrome text-oriented display; or "Graphical UI", a more powerful, color display having higher resolution and features for providing, e.g. windows and dialog boxes. The situation may be this: the client is enabled to operate only a "Console", and the "Console" is configured and active and the evaluator will indicate that is so. Thus an operation of the client requiring an instance from the SOI would proceed as follows:

Client makes a request, providing a typekey that includes the string "Display". SOI receives the request, and looks at the first situation it can retrieve, "Graphical UI". The "Graphical UI" situation is retrieved in (step 605), and its details are provided to Evaluator (step 607). Only the Situation is relevant to Evaluator, the typekey will be relevant at the step of calling the ObjectInstantiator (step 611), if reached.

Prior to the call to ObjectInstantiator, an Instantiator is determined to exist (step 610). If the Instantiator is determined not to exist (step 610) operation continues to consider if there are more situations (step 602). In some cases, for a given typekey, an Instantiator may exist for one situation, and not exist for another situation.

Prior to a client requesting an object, a client may execute a step of sending a definition of an ObjectInstantiator applicable to a key (e.g. a typekey) and, optionally, a situation. The SOI responds by receiving a definition and encapsulating such a definition within an ObjectInstantiator. During this step the client sends, and the SitutationObjectInstantiator receives a definition of at least one new object. The definition or definitions may define or create at least one object definition for a subset of all situations applicable to a typekey.

Evaluator gives an "inactive" result to SOI (step 609), and more situations are looked-up (step 603). The "Console" situation is retrieved (step 605). SOI calls Evaluator passing it a parameter that includes the string "Console" (step 607). Evaluator shows the situation of "Console" is active (step 609). SOI calls to ObjectInstantiator, passing it the "Console" and the typekey, "Display" (step 611). ObjectInstantiator returns a code object or instance (step 613) to SOI. SOI further returns the code object (step 615) to the client. Client then has a code object to produce the desired effect on the devices that are attached.

The client may have prior access to the one or more ObjectInstantiators to define and add to the scope and extent of objects that may be created as compared to the universe of typekeys.

Figure 7:
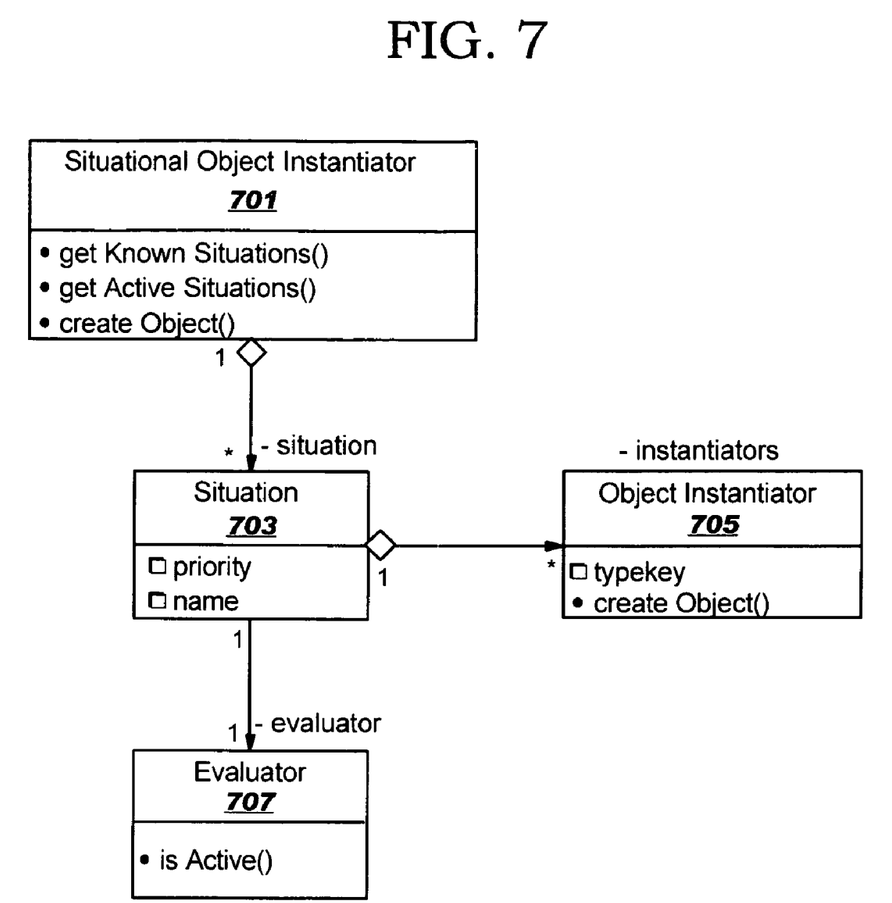
FIG. 7 is a Unified Modeling Language (UML) representation of the various object that operate cooperatively with the SituationalObjectInstantiator in accordance with a preferred embodiment of the present invention.

FIG. 7 shows a Unified Modeling Language diagram of how the SituationalObjectInstantiator (SOI) interacts with other objects. This interaction is found in a SOI, such as situationobjectinstantiator 505 in FIG. 5. SOI may have a one-to-many relationship with one or more situations 703. The situations 703 may have a name, e.g. "Console", or "Graphical UI". In addition, and optionally, each situation 703 may have an associated priority, which creates an order by which such situations may be retrieved. Each situation 703 has a one to many relationship with ObjectInstantiator 705. Objectinstantiator can be thought of as a database of objects that are indexed by a typekey, though it is entirely possible that there are no objects contained in ObjectInstantiator, and thus, alternatively, ObjectInstantiator 705 may dynamically create objects. The decision that may occur for each situation is operated by evaluator 707 which exists in a one-to-one relation with each situation.

Figure 8:
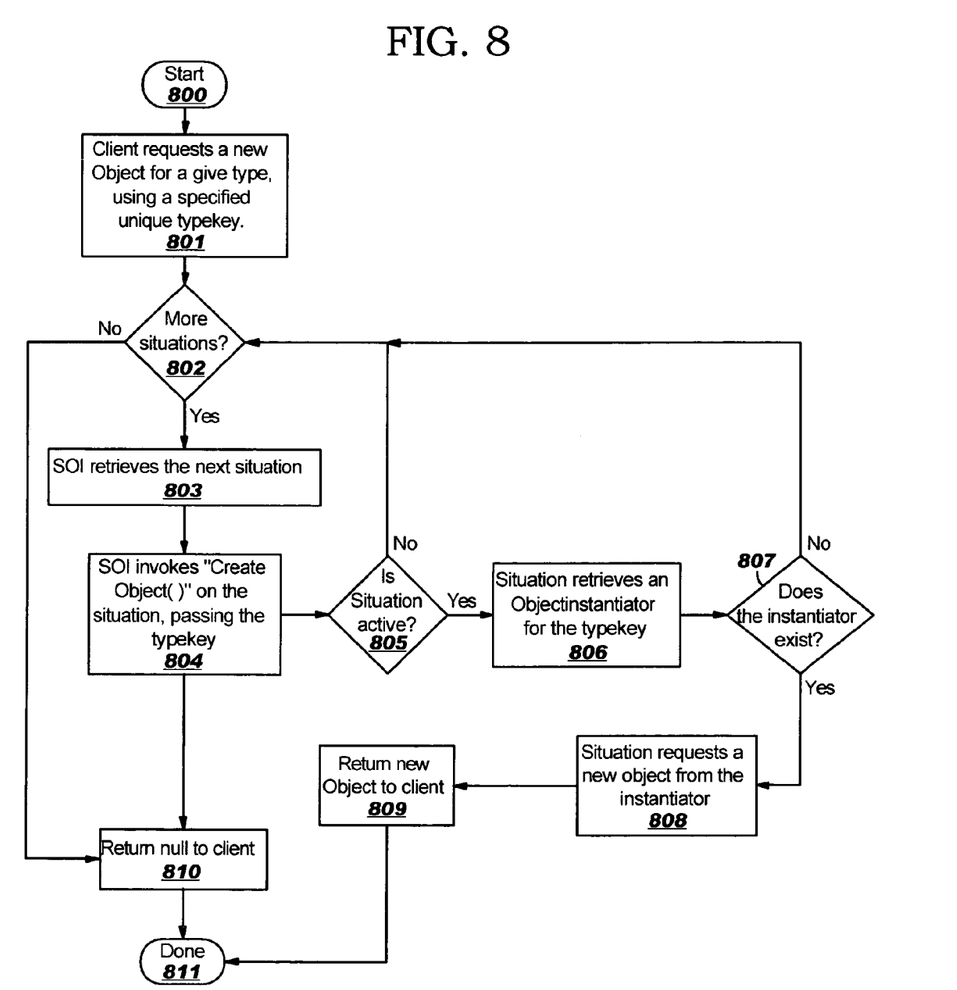
FIG. 8 is a flow chart of steps for the UML of FIG. 7 in accordance with a preferred embodiment of the present invention.

FIG. 8 is a flowchart showing the steps used by a preferred embodiment of the invention. Execution of steps of the situation object instantiator (SOI) begins as follows. A client requests (step 801) a new (code) object for a given type by using a unique key, or fully qualified class name. The unique key may be a typekey. While there are situations that have been left unexamined in the data structure of the SOI (step 802), the SOI loops through each such situation. The SOI retrieves the situation (step 803), and may invoke a function called createobjecto (step 804) by passing the typekey to the appropriate class or function. The Situation uses its associated Evaluator (which has a one-to-one relationship with the situation). Evaluator will make a determination that the situation is active or not active (step 805). An "active" determination will cause the situation to attempt to retrieve the appropriate ObjectInstantiator for the typekey (step 806). Failing to find the situation active causes looping back to (step 802). If step 807 finds an available (existing) ObjectInstantiator for the typekey and Situation, then the SOI will request a new instance for the typekey using ObjectInstantiator (step 808). The SOI returns the instance or code object to the client (step 809), and the process terminates (step 811). However, if the SOI exhausts all situations without finding any active, or alternatively, the active situation lacks an ObjectInstantiator for the typekey, then the main loop is exited at repeated Situation examination (step 802), and the SOI returns no object (step 810) (or a null) to the client, and terminates (step 811).

An absence of an available ObjectInstantiator at step 807 may mean that a database (if that is the implementation) does not have the ObjectInstantiator defined for the current Situation.

The step of determining the next Situation (step 803) may operate in one of two ways. Either the step may examine all priorities of the set of available Situations and select the highest first, until the final Situation selected is the one with the lowest priority. Alternatively, the Situations may be stored such that retrieval (step 803) automatically is in an order of Situations' priority.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, although the depicted embodiment is directed towards processing bytecodes in JAVA, the processes of the present invention may be applied to other programming languages and environments that process instructions, which are non-specific to a computer on which the instructions are to be executed. In such a case, a virtual machine on the computer may interpret the instructions or send the instructions to a compiler to generate code suitable for execution by the computer on which the virtual machine is located.

The embodiment was chosen and described in order to best explain the principles of the invention, the practical application, and to enable others of ordinary skill in the art to understand the invention for various embodiments with various modifications as are suited to the particular use contemplated.

What is claimed is:

1. A method to deliver a code object to a client in a system of at least a client and a server, the server having a database of a plurality of situations and having at least one object instantiator comprising the steps of:
   receiving a request from a client, wherein the request has a key;
   generating a first situation in response to receiving the request, the generating step including generating the first situation based on the first situation having a first priority higher than a second priority of a second situation;
   determining whether the situation is active;
   retrieving an object instantiator for the key wherein the object instantiator is determined to exist in response to determining that the situation is active;
   requesting an object from the object instantiator in response to retrieving the object instantiator; and
   delivering the object to the client in response to requesting an object from the object instantiator.

2. The method to deliver a code object of claim 1 wherein the generating step includes:
   looking up the first situation.

3. The method to deliver a code object of claim 1 wherein the generating step includes:
   dynamically generating the first situation based on the key.

4. The method to deliver a code object of claim 1, wherein the key is a fully qualified class name.

5. The method to deliver a code object of claim 1, wherein the key is a client defined value.

6. The method to deliver a code object of claim 1, wherein the first situation is active and the second situation is active.

7. The method to deliver a code object of claim 1, wherein the first situation has a first object instantiator and the second situation has no object instantiator for the key.

8. The method to deliver a code object of claim 7 wherein the step of receiving a request from a client is preceded by receiving at least one object instantiator definition applicable to a key.

9. The method to deliver a code object of claim 1 wherein the generating step comprises:
   looking up the first situation based on the first situation being active and the second situation not being active.

10. A situational object instantiator system to deliver a code object to a client in a system of at least a client and a server, the server having a database of a plurality of situations and having at least one object instantiator, the situational object instantiator system comprising:
    a processor;
    a situational object instantiator for:
       a receiving module for receiving a request from a client, wherein the request has a key;
       a generation module for generating a first situation, wherein the generation module generates the first situation based on the first situation having a first priority higher than a second priority of a second situation;
       a determination module for making a determination of active for the first situation;
       a retrieving module for retrieving an object instantiator for the key whereby the object instantiator is determined to exist in response to making a determination of active;
       a requesting module for requesting an object from the object instantiator in response to retrieving the object instantiator; and a delivery module for delivering the object to the client in response to requesting an object from the object instantiator.

11. The system situational object instantiator to deliver a code object of claim 10 wherein
the generation module looks up a first situation.

12. The system situational object instantiator to deliver a code object of claim 10 wherein
the generation module dynamically generates a first situation based on the key.

13. The system situational object instantiator to deliver a code object of claim 10 wherein
the key is a fully qualified class name.

14. The system situational object instantiator to deliver a code object of claim 10 wherein
the key is a client defined value.

15. The system situational object instantiator to deliver a code object of claim 10 wherein
the first situation is active and the second situation is active.

16. The system situational object instantiator to deliver a code object of claim 10 wherein
the first situation has a first object instantiator and
the second situation has no object instantiator for the key.

17. The system situational object instantiator to deliver a code object of claim 16 wherein
the receiving module is operatively coupled to a second receiving module for receiving at least one object definition for a subset of all situations applicable to a key.

18. A method to deliver a code object to a client in a system of at least a client and a server, the server having a database of a plurality of situations and having no object instantiator, comprising the steps of:
receiving a request from a client, wherein the request has a key;
generating a situation based on a first situation having a first priority higher than a second priority of a second situation;
determining whether the situation is active;
determining the object instantiator does not exist in response to determining that the situation is active; and
returning a null to the client.

* * * * *